United States Patent [19]

Van Doren

[11] 4,019,106
[45] Apr. 19, 1977

[54] MOTOR SPEED CONTROL

[75] Inventor: Robert L. Van Doren, Garden Grove, Calif.

[73] Assignee: Taylor-Dunn Manufacturing Company, Anaheim, Calif.

[22] Filed: Mar. 18, 1974

[21] Appl. No.: 452,384

[52] U.S. Cl. .............................. 318/252; 318/442; 318/528; 318/529; 318/534

[51] Int. Cl.[2] ......................................... H02P 7/00

[58] Field of Search .......... 318/528, 529, 530, 534, 318/524, 442, 249, 251, 252; 200/18

[56] References Cited

UNITED STATES PATENTS

| | | | |
|---|---|---|---|
| 621,285 | 3/1899 | Reed | 318/139 |
| 638,522 | 12/1899 | Rae | 318/139 |
| 649,797 | 5/1900 | Barreau | 318/139 |
| 1,155,164 | 9/1915 | Riley | 318/139 |
| 1,291,233 | 1/1919 | Storer | 318/139 |
| 3,604,994 | 9/1971 | Conlon | 318/252 |
| 3,668,490 | 6/1972 | Conlon | 318/245 |
| 3,668,491 | 6/1972 | Kelley | 318/245 X |
| 3,678,357 | 7/1972 | Swanke | 318/252 |
| 3,746,804 | 7/1973 | Gammill | 200/18 |
| 3,862,383 | 1/1975 | Bednarek et al. | 200/18 X |
| 3,923,116 | 12/1975 | Thompson et al. | 318/139 |

Primary Examiner—B. Dobeck
Attorney, Agent, or Firm—Gausewitz, Carr & Rothenberg

[57] ABSTRACT

A switch for speed control of an electric motor driven vehicle employs a combination of resistance switching, field weakening and voltage switching. A mechanical switch assembly has a speed switch and a voltage switch that are interconnected so that the voltage switch provides 36 volts when the speed switch is in neutral and fifth speed position and provides 18 volts when the speed switch is in first through fourth speed positions. The speed switch has an operator controlled rotor arm that successively engages a neutral contact and five driving speed contacts so that varying resistance is inserted in circuit with the motor armature in the first two speed positions and no external resistance is employed in the third and fifth speed positions. The motor field comprises pairs of first and second oppositely disposed series wound coils with the pairs of coils all connected and energized in series in all but the fourth speed position. In the fourth speed position one pair of oppositely disposed field coils is completely disconnected while the other pair is energized to provide a higher speed at the lower voltage and a better transition between low and high voltage driving speeds.

7 Claims, 18 Drawing Figures

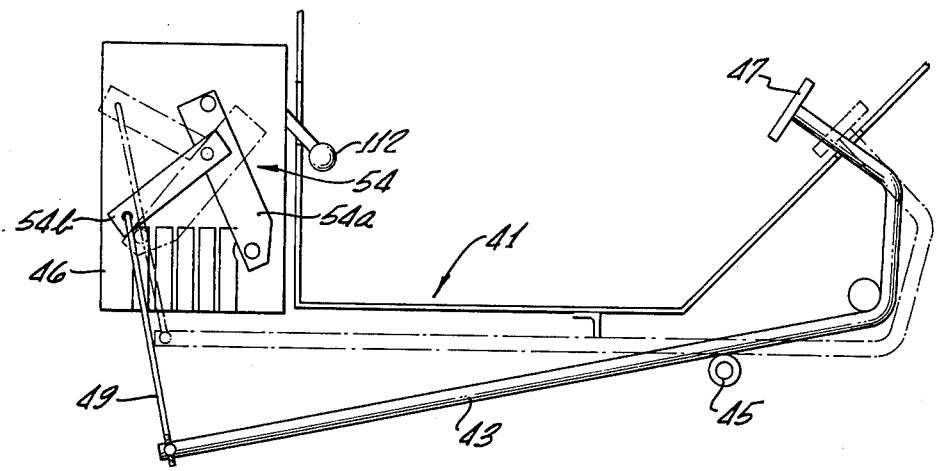
FIG. 4.
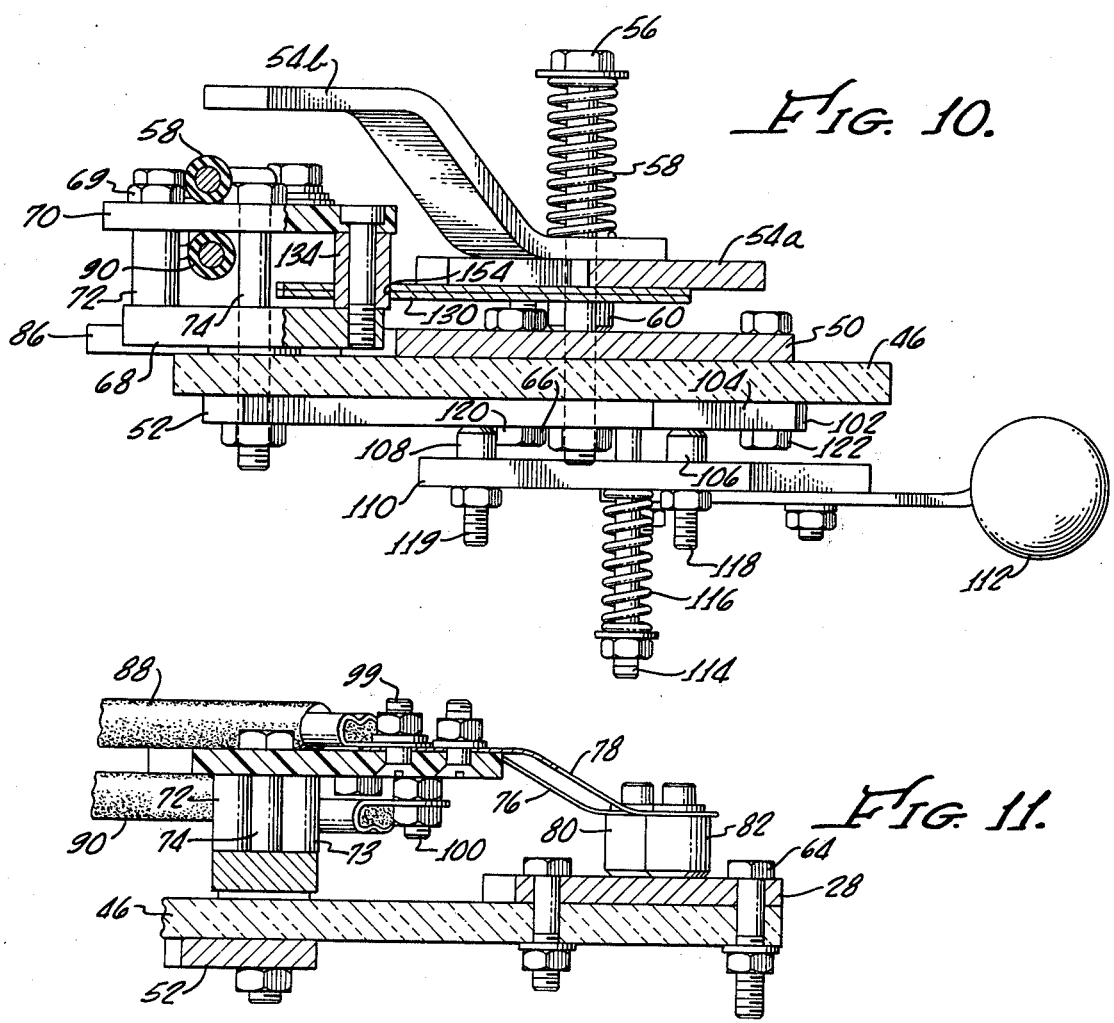
FIG. 10.
FIG. 11.

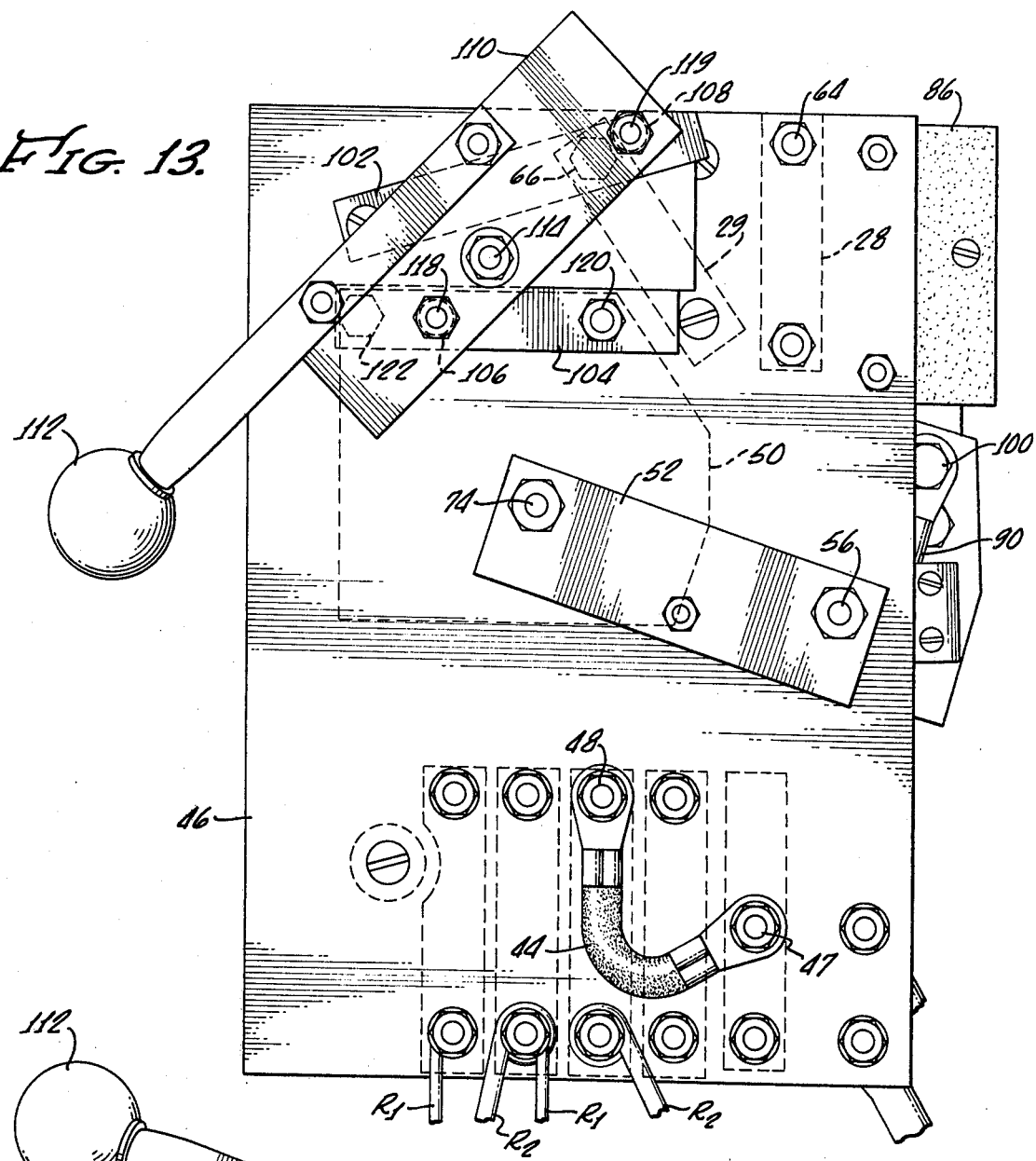
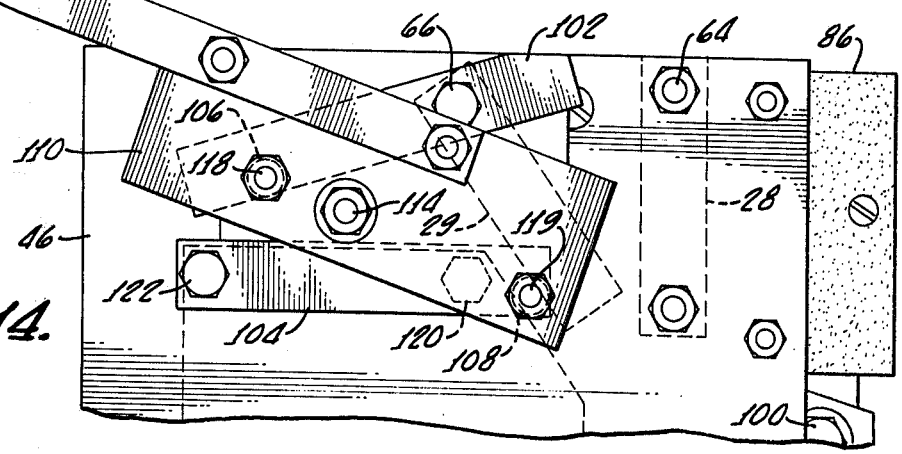

MOTOR SPEED CONTROL

BACKGROUND OF THE INVENTION

1. Field of the Invention

The present invention relates to the speed control of electric motors and more particularly concerns switching operations and mechanisms for providing a smoothly varying and efficient speed control.

2. Description of Prior Art

Speed control of electric motors in diverse applications has been the subject of design and development over a period of many years. It is known that the speed of a direct current electric motor increases with an increase of applied voltage, decreases with an increase in resistance in circuit with windings and increases as magnetic flux entering the armature decreases. For battery operated devices, various methods of switching multiple batteries to and from series, parallel and series-parallel arrangements are known and described in a number of U.S. Patents, including U.S. Pat. Nos. 640,968; 969,513; 1,189,947; 3,264,540; 3,566,985 and 3,718,848. However, voltage switching, or more specifically, battery switching, alone cannot provide an adequate range and smoothness of transition among varying speeds.

Several types of field weakening or decrease of magnetic flux have been employed as exemplified by U.S. Pat. Nos. 789,377; 1,189,947; 1,291,233; 2,472,646; 3,264,540; 3,283,227 and 3,348,111. In these arrangements, various field windings of the motor are switched from series connection to parallel connection, taking advantage of the fact that inductive coils in series produce stronger magnetic flux because all of the current passes through each coil. Further, with the coils in parallel only part of the current passes through each coil and accordingly, a weaker magnetic field, a field weakening, is produced to to provide an increased speed. In some of this group of field winding switching patents, different ones of the windings are selectively switched on or off as desired. Again, field weakening as the sole method of motor speed control will not provide a practical and economical speed control with smooth transition and wide range of speed variation. Further, unique variations and combinations of motor windings required for field weakening schemes of the prior art greatly add to motor costs.

U.S. Pat. No. 789,377 shows an arrangement of selectively shunting field coils in a manner to provide three different speeds. However, shunting as distinguished from complete disconnection, is not adequate for many uses, since shunt contacts may vary in resistance particularly as contacts wear, become eroded, and otherwise foul, so that a shunt may actually increase in resistance as it ages. Still further, the various prior art methods of switching from series to parallel or parallel to series connections of different coils require actuation of a minimum of three independent contacts for the one switching step, thus requiring ganged switches or plural solenoids.

A widely employed motor speed control involves the use of a rheostat or continuously variable resistance placed in circuit with the field windings or with the field windings and armature windings. As the resistance in circuit with the field winding is decreased, speed of the motor increases. However, increasing the resistance, as required for lower speeds, decreases the efficiency of power usage since the greater the resistance in the circuit the greater amount of electric power that is wasted by the control mechanism.

Electronic switching systems employing thyratron power controls or silicon control rectifier (SCR) control systems eliminate or minimize many of the above mentioned disadvantages. They provide a wide range of smoothly varying speed and substantially eliminate inefficiencies of resistive speed control. Nevertheless, such systems are complex and costly, particularly where speed control of vehicle motors are concerned. Electronic valves such as the solid state SCR's capable of handling the large current required in vehicle operation, and having a life long enough to satisfy requirements of such vehicle operation, are considerably more expensive than other types of control systems. Further, the more complex electronic control systems require more difficult and costly upkeep and repair.

Combinations of different methods of speed control have been suggested, but only in arrangements that are complex, expensive, inefficient and difficult to repair. The patent to Beach, U.S. Pat. No. 969,513, illustrates use of different types of speed control employing a complex drum type switch that is difficult and costly to manufacture and maintain and entails a complicated sequence of switching steps that will cause inefficiency and lack of reliability.

The patent to Dannettell, U.S. Pat. No. 3,264,540, shows a combination of speed control arrangements requiring eight different double pole switches and a pair of diodes to provide varying speed by varying the resistance in series with the windings, switching the batteries from series to parallel connection and switching the fields from series to parallel connection. The large number of different switches required greatly adds to the cost and complexity of this system while concomitantly decreasing reliability and ease of maintenance and repair. Particularly where solenoids are employed to perform the switching action, major compromises are required between costs and reliability. Reasonably economical solenoids capable of handling powers required for speed control of electric motor driven vehicles have a relatively short lifetime and will generally fail after an unacceptably small number of operations. Since such switches in a speed control system are operated with great frequency, requiring at least one operation of a switch for each speed change in either direction, solenoid operated switches for this purpose must be capable of operating over millions of cycles. Such stringent requirements can be met only with solenoid devices that cost too much to be economically acceptable. On the other hand, the complex multitude of switching operations required of a device such as illustrated in Dannettell does not lend itself to mechanical switching.

In a system of the prior art, presently employed for speed control of golf cart motors, a first speed range is provided by a resistor and a parallel connection of a pair of 18 volts batteries, a second speed range is provided by the parallel 18 volt batteries alone, a third speed range is provided by the resistor with the 18 volt batteries connected in series to provide 36 volts, and a fourth speed range is provided by the 36 volt series connected batteries without the resistor. As previously mentioned, the use of the resistor in circuit with the windings wastefully dissipates power. Further, the higher the voltage with which the resistance is employed, the greater the waste. In the just mentioned prior art system, this inefficiency is recognized and provision is made to automatically shift from the inefficient third speed position (employing a resistor in series with 36 volt supply) directly to the efficient high speed use of the 36 volt supply alone. However, it is found that in certain types of applications, such as motors for golf carts, for example, as much as 40% of the driving time may be at the next to the highest speed. This most frequently used speed is generally in the order of 7 to 8 miles an hour in a golf cart having a top speed of 10 miles an hour. Thus, where resistive control is used, as in the just described prior art system, the most commonly used speed is the speed at which there is the greatest waste of power. Nevertheless, in the prior system, it is found necessary to use this third speed employing 36 volts and resistor speed control to enable a smooth transition between the speeds available at 18 volts and the high speed available at 36 volts.

Accordingly, it is an object of the present invention to provide electric motor speed control that substantially avoids or minimizes the above mentioned disadvantages without significantly compromising cost of manufacture and repair, operating lifetime, and efficiency or smoothness of operation through the various speed ranges.

SUMMARY OF THE INVENTION

In carrying out principles of the present invention, in accordance with a preferred embodiment thereof, a motor speed control affords low and high speed ranges at lower and higher voltages and provides an intermediate speed range by disabling at least one pair of field windings while another pair of windings remains energized at lower voltage. According to a feature of the invention, switching from one voltage to another is coordinated with the movement of a speed switch between specific speed ranges.

More specifically, a unique mechanical switch configuration includes a speed switch assembly and a voltage switch assembly with a connection between the two to actuate the voltage switch assembly in response to operation of the speed switch assembly through selected portions of its travel. In one embodiment, a cam and cam follower move the voltage switch to a first voltage condition when the speed switch is in either neutral or high speed position and move the voltage switch to a second voltage condition when the speed switch is at one or more of its intermediate speed positions. The speed switch provides variable resistance speed control and also provides field weakening speed control. Field weakening is achieved by a unique arrangement of pairs of oppositely disposed series wound field coils at least one of which is selectively connected or disconnected for field strength control of speed.

The improved efficiency of the present invention is such that less powerful batteries, when used with the control of this invention, will adequately power a golf cart over a course that requires use of greater power batteries with prior motor speed control devices.

BRIEF DESCRIPTION OF THE DRAWINGS

FIG. 4 illustrates the mounting of a speed and voltage switch assembly of an embodiment of the present invention, connected with a speed control pedal of an exemplary vehicle;

FIGS. 10 and 11 are cross sections taken on lines 10—10 and 11—11 of FIG. 7;

FIG. 13 and 14 show the back side of the switch assembly, with the reversing switch in different positions, and with parts broken away.

DETAILED DESCRIPTION

Figure 1:
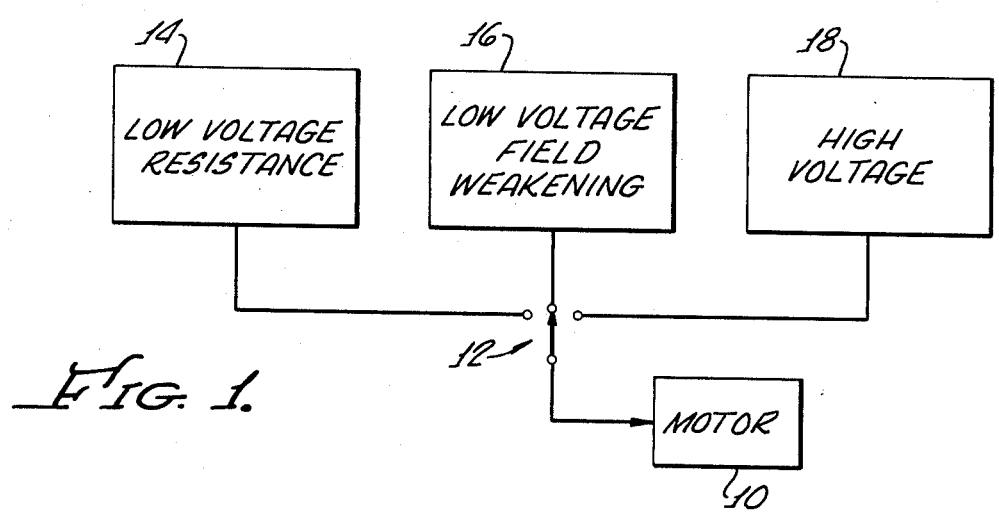
FIG. 1 is a functional block diagram of the sequence of the several methods of speed control employed in a preferred embodiment of the present invention.

As functionally illustrated in FIG. 1, a dc electric motor 10 has its speed controlled via a speed control switch 12 through a plurality of different speed regions of which the first region, indicated by box 14, applies a low voltage and a variable resistance to the motor. In a second speed region, the low voltage is applied to the motor and a unique field weakening provides still further increase of speed as indicated by box 16. In the high speed region, as indicated by box 18, the speed control switch provides high voltage to the motor. If deemed necessary or advisable, the three illustrated speed regions can be separated into different speeds by provision of additional resistances, varying the resistance steps as necessary. Nevertheless, the arrangement illustrated is preferred wherein at high voltage condition, all windings at full field strength are employed and no external resistance is inserted in the circuit. Variable speed is provided in the low speed region in which low voltage is supplied by inserting different resistances in circuit with the motor. In order to bridge the difference between the maximum speed at low voltage and the speed at high voltage, field weakening is employed as will be more particularly explained below. Field weakening for an intermediate speed range is much preferred to resistive speed control at high voltage because of the increased efficiency. Resistive control at higher voltages is exceedingly wasteful.

The switching arrangement has been embodied in the control of a series wound motor (and is so illustrated) although it will be readily appreciated that principles of this invention may be readily applied to a compound wound motor in which field coils are provided both in series and in parallel with the armature. When used with a compound motor, the speed control described herein will operate solely upon those of the field coils that are in series with the motor armature.

Figure 2:
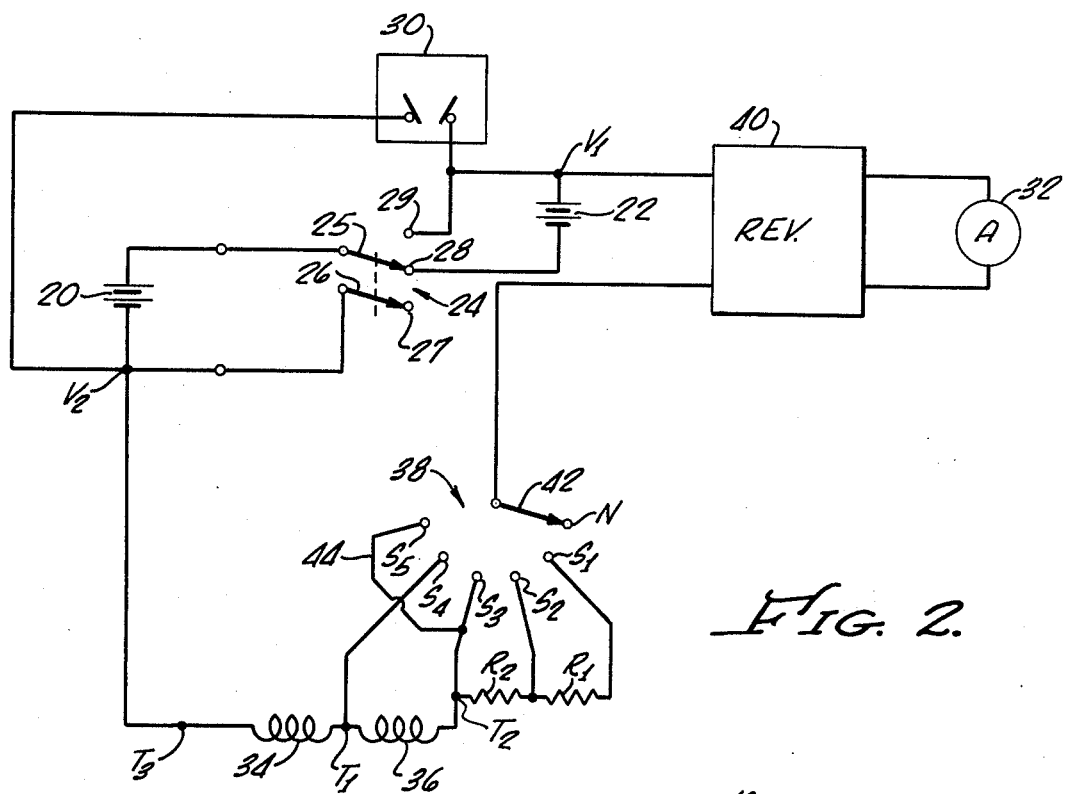
FIG. 2 is a schematic diagram of the electrical circuit including batteries and switches of a preferred embodiment of the present invention.

FIG. 2 comprises a schematic diagram of the electrical circuit of a preferred form of the speed control of the present invention. First and second voltage sources 20, 22 are interconnected through a voltage switch assembly 24 to provide at their output terminals $V_1$ and $V_2$ either a low voltage or high voltage. The voltage switch includes a pair of ganged movable switch arms 25, 26 and a plurality of fixed voltage switch contacts 27, 28, 29. Movable arm 25 is connected to one side (positive) of the voltage source 20 and movable arm 26 is connected to both output terminal $V_2$ and the other side (negative) of voltage source 20. Fixed contact 29 is connected to the positive side of voltage source 22 and also to the battery output terminal $V_1$. Fixed contact 28 is connected to the negative side of the voltage source 22. Fixed contact 27 is floating, not connected to any of the other circuits.

A battery charging receptacle 30 is connected to voltage terminals $V_1$ and $V_2$ and is employed to accept a charging current for charging both of the voltage sources 20 and 22. Conveniently, the voltage sources 20 and 22 each comprises a set of three series connected conventional 6 volt batteries to provide 18 volts across each.

With the voltage switch 24 in the position illustrated in FIG. 2, the two batteries are in the high voltage condition, being series connected so that 36 volts are available across terminals $V_1$ and $V_2$. When the voltage switch is moved to the other of its two positions (not illustrated in FIG. 2), arm 25 engages contact 29 and arm 26 engages contact 28, whereby both negative sides of the two batteries are connected to each other and to the terminal $V_2$ and both positive sides of the batteries are connected to each other and to the terminal $V_1$, whereby the batteries are connected in parallel to provide an 18 volt output.

The batteries are connected to energize an electric dc motor having a conventional armature 32 and first and second pairs of field windings 34, 36.

Figure 3:
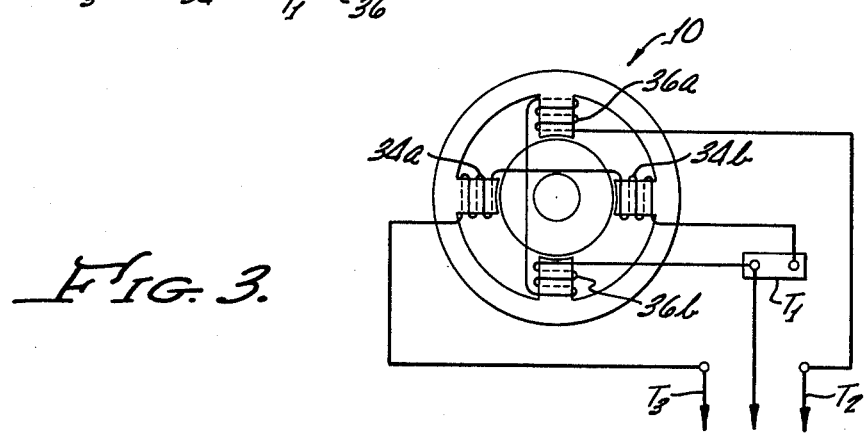
FIG. 3 illustrates pairs of field windings of a typical motor to be controlled by the speed control of FIG. 2.
Figure 5:
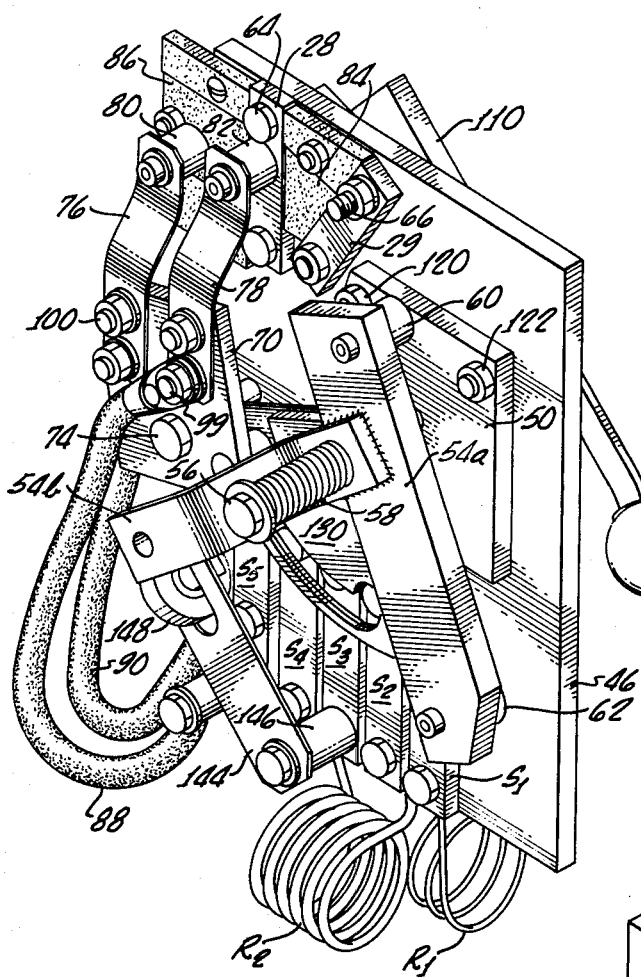
FIG. 5 is a perspective view of the front side of the switch assembly.

As schematically illustrated in FIG. 3, windings 34$a$, 34$b$ of the first pair of windings 34 are connected in series with each other and are oppositely disposed relative to each other. Windings 36$a$ and 36$b$ form the winding pair 36, and are likewise series connected and oppositely disposed. The windings of the two pairs preferably have nearly the same number of turns and in a preferred embodiment, each of windings 34$a$, 34$b$ has 9 turns, and each of windings 36$a$, 36$b$ has 11 turns. The two pairs of series connected windings are connected to each other at a common junction $T_1$. The other ends of the winding pairs are connected respectively, at winding terminals $T_2$ and $T_3$ to a speed switch 38 and to one of the battery voltage terminals $V_2$ (FIG. 2). Speed switch 38 connects the windings 34, 36 in series with the windings of armature 32. A reversing switch 40 is interposed between the armature 32, the speed switch 38 and the other voltage terminal $V_1$ so that direction of motor rotation may be reversed by the reversing switch in any of the speed switch positions.

Speed switch 38 comprises a speed switch arm or rotor 42 that is arranged to be operated by an accelerator pedal, more particularly described below, to selectively and sequentially engage a plurality of speed switch contacts respectively identified as N (for neutral or off), $S_1$, $S_2$, $S_3$, $S_4$ and $S_5$. A first resistor $R_1$ is connected between fixed speed switch contacts $S_1$ and $S_2$ and a second resistor $R_2$ is connected between fixed speed switch fixed contacts $S_2$ and $S_3$.

Speed switch fixed contacts $S_3$ and $S_5$ are electrically connected to each other by a shunt 44 and both are connected to terminal $T_2$ at one side of the series connected coils 36.

In neutral position, when the motor is not running, both speed and voltage switches are in the position illustrated in FIG. 2. To start the motor, speed switch arm 42 is moved from engagement with fixed contact N to engagement with the first low speed contact $S_1$. By means of a connection to be more particularly described below, voltage switch 24 is moved from the illustrated high voltage to its low voltage position at the same time that the speed switch moves from the neutral position to the first low speed position.

In the first low speed position, 18 volts are fed from terminal $V_1$ through one contact of the reversing switch, through the armature 32, through the other contact of the reversing switch, thence through the speed switch arm 42, through both resistors $R_1$ and $R_2$ via speed switch contact $S_1$, through both pairs of series connected field windings, 34, 36 and thence to the other voltage terminal $V_2$ of the now parallel connected batteries.

The current path is substantially the same in the second and third low speed positions wherein speed switch arm 42 is in electrical contact with contacts $S_2$ and $S_3$, except that when the arm 42 is engaged with contact $S_2$, resistor $R_1$ is disconnected and only resistor $R_2$ is in circuit. With the arm 42 engaged with low speed contact $S_3$, both resistors $R_1$ and $R_2$ are disconnected and no external resistance is applied to the series connected pairs of windings 34, 36.

The arrangement is such that with the use of substantially conventional 6 volt batteries connected to provide two 18 volt sources as previously described, and with the motor and control mounted for driving a conventional golf cart, for example, a speed of 3.4 miles per hour is provided in first speed, 4.5 miles per hour in second speed, and a speed of 5.3 miles per hour in the third speed.

Momentarily omitting the intermediate or fourth speed position, when the speed switch arm 42 moves to the high speed position, in engagement with contact $S_5$, the connection between the speed switch and voltage switch to be described below actuates the voltage switch to move it back to its high voltage condition in which the two batteries 20, 22 are connected in series between the output terminals $V_1$ and $V_2$. Accordingly, the circuit previously described is applied to the motor armature and to the series connected pairs of coils, but at the higher 36 volts, whereby the highest speed is achieved.

The highest speed of the described arrangement, in an exemplary embodiment thereof applied to a conventional golf cart, is 10 miles per hour. Since the third speed is but 5.3 miles per hour, the difference between speeds in third and fifth speed positions is too great to provide smooth and comfortable operation. In the past this difference has been broken down into a plurality of steps by providing a fourth speed at which the higher or 36 voltage power is applied, but in which the speed is decreased by inserting a resistance in series with the field windings. Such an arrangement will provide a more comfortable intermediate speed between the highest of the low region speeds, wherein 18 volts without resistance is applied to the motor, and the high speed wherein 36 volts without resistance is applied to the motor. Nevertheless, insertion of resistance for speed control with application of the 36 volts to the motor is inordinately wasteful of energy. Furthermore, as previously indicated, such intermediate speed, a speed between 5 and 10 miles per hour is the speed used in many types of vehicles for a greater percentage of the vehicle operating time than other speeds. Thus, the most used speed would be the most wasteful is a resistance type speed control at 36 volts is employed.

To provide a smooth intermediate speed of greater efficiency, a unique form of field weakening is provided between third and fifth speeds. The type of field weakening chosen is peculiarly arranged for operation together with a speed switch of simplified construction. The field weakening method chosen requires only control of a single contact, that is, opening one contact and closing another, and thus directly adapts itself for use with the sequential stepping of the illustrated speed switch. This field weakening, using the lower 18 volts with no external resistance, provides a fourth speed of 7.5 miles per hour in the above described exemplary golf cart.

As shown in FIG. 2, field weakening for fourth speed is achieved by connecting the speed switch fixed contact $S_4$ to the common junction $T_1$ between the two pairs of oppositely disposed series connected field windings 34, 36. The low voltage 18 volts are still applied to the circuit in this fourth or intermediate speed position. The low voltage is applied via the reversing switch and armature 32 as before, through the speed switch arm 42, to contact $S_4$, terminal $T_1$ and through the field winding pair 34 to the voltage terminal $V_2$. In this fourth speed the field winding pair 36 is completely disconnected from the circuit. It is not merely shunted, and thus, resistance of the speed switch contacts will have no effect upon operation of the disabled pair of windings. Thus, a transistion speed between the 18 and 36 volt speeds provides improved efficiency, decreased power dissipation and yet smoothly adapts itself to the simple sequential multi-contact switching action of the speed switch.

As will be described more particularly below, connections between the speed switch 38 and the voltage switch 24 not only operate as the speed switch moves from neutral position to top speed position, but also operate in the reverse direction of motion of speed switch 38. Accordingly, as the switch arm 42 moves from engagement with contact S5 to engagement with contact S4, the voltage switch 24 is moved from its high voltage position, illustrated, to its unillustrated low voltage position wherein it remains as the switch arm moves through its engagement with contacts $S_4$, $S_3$, $S_2$ and $S_1$. As the speed switch arm 42 moves from engagement with contact $S_1$ to the off or neutral position N, the connection between the speed switch and voltage switch once again operates the latter to move it to its high voltage condition. Accordingly, with the motor control in off, the voltage sources are always connected in high voltage condition wherein they may be readily charged via the charging receptacle 30. Since conventional charging devices are adapted to provide charge to 36 volt sources, it is desirable to ensure that the voltage source of this speed control is in its high voltage or 36 volt condition when the speed switch is in neutral or off.

It will be readily appreciated that the speeds described in the exemplary embodiment are available with a certain gearing and motor size. Other groups of speeds may be obtained by use of other gearing or other motors.

MECHANICAL CONSTRUCTION

A significant feature of the present invention comprises a completely mechanical switching arrangement employing sturdy, simple and reliable mechanical components, that provide desired sequencing of connections for the several types of speed control achieved by the electrical circuitry. Conversely, the choice of the combination of several different methods of speed control, that is resistive control, the unique type of field weakening, and voltage control, and the particular sequencing of the various steps thereof, are readily adapted to the described simplified all mechanical switching. Thus, although either the mechanical arrangement alone or the functional sequencing of speed control alone could find application in motor control, the combination of the particularly described mechanical switching arrangement together with the specific sequencing provides a unitary result by virtue of the unique cooperative functioning of the several electrical circuit and mechanical elements.

The various mechanical switching elements together with certain electrical components are all mounted upon and carried by a support or mounting board 46 in the form of a rigid non-conductive plate that is readily adapted to be bolted or otherwise fixed to the vehicle of which the motor is to be controlled.

As illustrated in FIG. 4, support 46 is rigidly mounted to a vehicle partially shown and designated by reference character 41. Pivoted to the vehicle is a speed control linkage, shown as a rigid bar 43 that is journalled on a fixed pivot 45. The bar 43 has a foot control or an accelerator pedal 47 at one end and is pivoted to a speed control switch arm or rotor 54 by means of an adjustable operating rod 49. Rotor 54, as described more particularly below, takes the form of a bell crank having a contact arm 54a and having an operating arm 54b that is pivotally connected to the operating rod 49. A pull back spring (now shown) urges the control bar 43 in a counter-clockwise direction (as viewed in FIG. 4) about its pivot 45. In off or neutral, the pedal 47 and rotor 54 are in the position illustrated in solid lines in FIG. 4. The vehicle driver will depress pedal 47 with his foot, moving the pedal against the force of the pull back spring toward the high speed position, shown in dotted lines. This rotates the speed switch rotor in a clockwise direction toward its high speed position shown in dotted lines.

The speed switch comprises a plurality of fixed power bars or contacts including a neutral button N and copper bars $S_1$, $S_2$, $S_3$, $S_4$, and $S_5$ (FIGS. 5, 7, 8 and 9) all securely bolted to support 46. Resistor $R_1$ is bolted to and between the electrically conductive bars $S_1$ and $S_2$. Resistor $R_2$ is bolted to and between electrically conductive bars $S_2$ and $S_3$. A shunt 44 (FIGS. 6, 13) in the form of an insulated electrical wire is electrically connected to both of the contacts $S_3$ and $S_5$ by means of electrically conductive bolts 47, 48, that are among the bolts fixing the contacts $S_3$ and $S_5$ to support plate 46. An electrically conductive speed switch contact plate 50 is fixed to support 46 by means of bolts that extend through the support, through the speed switch contact plate and through a reinforcing plate 52 on the back side of support 46.

Speed switch arm or rotor 54 is formed as a rigid bell crank having contact arm 54a and operating arm 54b affixed thereto. Operating arm 54b contains an aperture or other suitable connecting means for pivotally receiving and securing accelerator link 49 (FIG. 4) by means of which the speed switch rotor is moved through its various positions.

The speed switch bell crank rotor is journalled upon a pivot shaft 56 that is carried by the contact plate 50 and reinforcing plate 52 and includes a compression spring 58 compressed between the rotor and a washer carried by the pivot shaft to press the speed switch rotor toward the support plate 46.

The upper end (as seen in FIGS. 5, 7, 8 and 9) of the speed switch contact arm 54a carries an upper contact button 60 adapted to make electrical contact with contact plate 50 throughout the motion of the speed switch arm.

The lower end of speed switch arm 54a carries a lower contact button 62 that is adapted to sequentially and selectively make electrical contact with the speed switch fixed contacts $S_1$ through $S_5$ and the neutral button N. The several fixed contacts $S_1$ through $S_5$ and N each has a width in a direction substantially along the path of travel of the lower contact button 62 that is substantially equal to the width of the lower contact button. The several contacts or fixed contacts are spaced apart by distances that are considerably smaller than the width of the contact button 62. Therefore, the contact button 62, as it travels from one of the fixed contacts to an adjacent fixed contact, will bridge the two adjacent contacts and thus, the transfer of current from one of the fixed contacts to another will be progressive. In other words, considering that the engaging surface between the fixed and movable contacts has a finite (though quite small) resistance, as the switch moves from one contact, such as $S_3$ for example, to an adjacent contact, such as $S_4$, current flowing between the speed switch rotor and the fixed contact $S_3$ will progressively decrease and, concomitantly, current flowing between the speed switch rotor and the fixed contact $S_4$ will progressively increase.

Support 46 also mounts a voltage switch assembly comprising first and second fixed contacts in the form of battery contact power bars 28, 29 (FIGS. 5, 7, 8 and 9), which are bolted to the support by means of bolts including bolts 64, 66. The voltage switch rotor assembly include a base plate 68 and a voltage switch arm or rotor 70 fixedly connected to each other and spaced from each other by means of bolts 69, 71 carrying spacer sleeves 72, 73, as shown best in the part of FIG. 7 that is broken away. The voltage switch base plate 68 and rotor 70 are pivoted to support 46 by means of a shaft 74 that is fixed to and extends through the support 46 and the reinforcing plate 52. Thus, the reinforcing plate 52 assists in carrying both of the fixed pivot shafts 74 and 56 of the voltage switch and speed switch, respectively.

A pair of resilient or spring contact fingers 76, 78 are fixed in electrical contact with the voltage switch rotor 70 and project therefrom towards the upper portion of the support plate 46 and toward the surface of the support plate 46 on which are mounted the voltage fixed contacts 28, 29. The free end of each of the resilient contact fingers 76, 68 carries a respective one of a pair of main power contact buttons 80, 82 which, accordingly, are pressed by the spring fingers 76, 78 into firm sliding electrical contact with the mutually spaced fixed contact bars 28, 29, and also into firm engagement with electrically non-conductive spacers 84, 86 as the voltage switch rotor moves between its two positions. Spacers 84, 86 are fixed to support plate 46 between contacts 28, 29 and to one side of contact 28 respectively.

Bolts 25, 26 (see the lower left corner of FIGS. 7, 8 and 9) are affixed to support 46 and comprise the electrical terminals (movable voltage switch contacts) having like reference numerals in FIG. 2. These bolts are connected by means of insultated conductors 88, 90 to bolts 99, 100 (FIG. 5 and 11) that secure the spring fingers 78, 76, respectively, to the voltage switch rotor plate 70. All of the bolts employed are conventional and electrically conductive.

The voltage switch rotor and its spring fingers 76, 78 and contact buttons 80, 82 are movable between high and low voltage positions as described above in connection with the description of voltage switch 24 of FIG. 2. In the position illustrated in FIG. 5, the parts are electrically connected in the same manner as they are in the illustration of FIG. 2 with the movable contact 82 of the voltage switch in electrical contact with fixed contact 28 which in turn is connected via the bolt terminal 64 to the negative terminal of the battery 22 of FIG. 2. The spring finger 78 via the voltage switch rotor and electrical lead 88 is electrically connected to the "movable" terminal bolt 25 which is connected to the positive side of the second battery 20 whereby the two batteries are connected in series when the voltage switch is in the position illustrated in FIG. 5. In this position, no contact is made between the voltage switch rotor and the second voltage switch fixed contact 29, nor is any electrical contact made with the second spring arm 76 and its contact button 80 since the latter rides on the non-conductive spacer 86.

Figure 8:
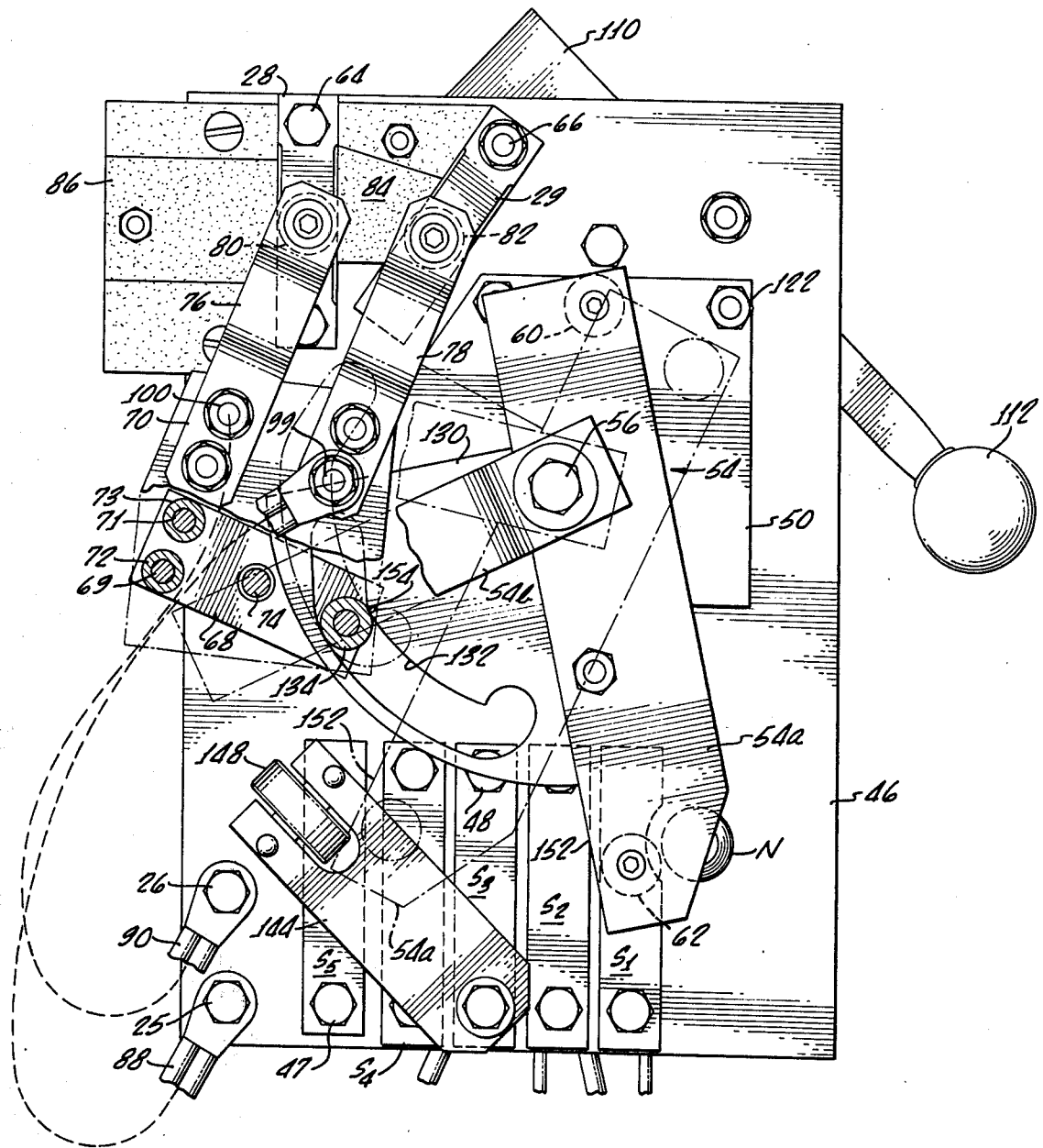
FIG. 8 illustrates the switch assembly in first speed position in solid lines and at the threshhold of fifth speed position in dotted lines, with certain electrical conductors shown schematically.

In a second position of the voltage switch, as illustrated in FIG. 8, spring arm 78 presses the movable contact 82 into electrical engagement with the voltage switch fixed contact 29 and at the same time spring arm 76 presses its contact button 80 into electrical engagement with the voltage switch contact bar 28. Thus, the fixed contact 29, which is connected by means of terminal bolt 66 (at the front of support 46) to the positive side of battery 22, is connected to the "movable" terminal 25 and thus, to the positive side of battery 20. Similarly, the fixed contact 28, which is connected to the negative side of battery 22, by means of terminal bolt 64 (at the back of support 46, is connected via spring arm 76 to the "movable" terminal 26 which is connected to the negative side of battery 20. Accordingly, in the position illustrated in FIG. 8, the voltage switch connects the two batteries in parallel.

Since the spring arms 76, 78 together with their contact buttons 80, 82, are both fixed to the voltage switch rotor plate 70, the two contact buttons move in unison as the rotor moves between its two positions.

The spring fingers 76, 78 are mounted so that their contact buttons 80, 82 are spaced from each other a distance that is slightly greater than and in no event less than the width of the contact bars 28, 29, which have mutually equal widths. Further, the space between contact bars 28, 29, as measured along the path of travel of the movable contact buttons 80, 82, is slightly greater than but in no event equal to or less than the extent of the movable contact buttons 80, 82 respectively. Thus, the contact buttons cannot bridge across the contact bars 28, 29 to connect these to each other and further, neither of the contact bars will bridge between the movable contact buttons 80, 82 to connect these to each other. Plates 84, 86 provide non-conductive bearing surfaces to restrain the spring pressed motion of the contact button 80, 82 when these are not engaging and pressing against the electrically conductive contacts 28, 29.

Figure 6:
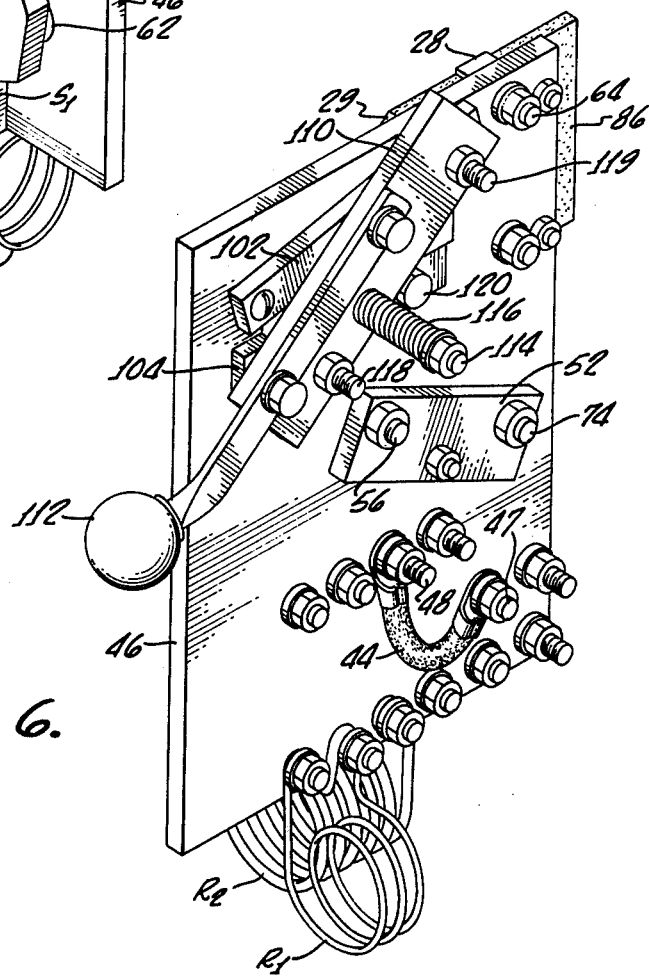
FIG. 6 is a perspective view of the back side of the switch assembly.
Figure 7:
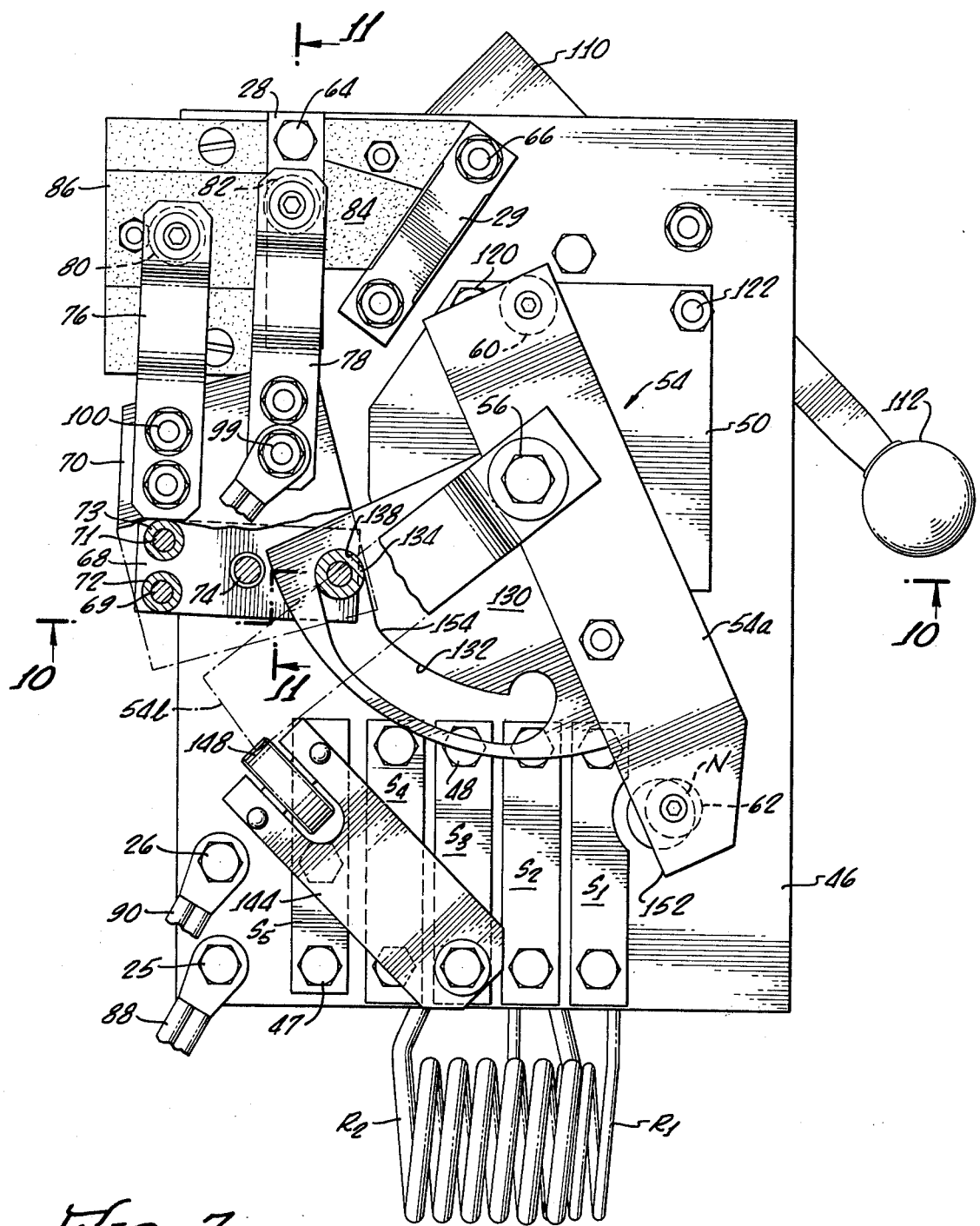
FIG. 7 is a view, with parts broken away, of the front side of the switch assembly, in neutral position.

As illustrated in FIG. 6, 13 and 14, a reversing switch is carried by the support 46 and includes first and second forward reverse contact bars 102, 104 which are adapted to be selectively contacted by first and second movable contact buttons 106, 108, carried by an electrically non-conductive forward reverse rotor 110. Forward reverse rotor 110 fixedly carries an operating handle 112 and is pivoted to the support 46 upon a pivot shaft 114 that carries a spring 116 which presses the rotor 110 toward the support 46 and fixed contact bars 102, 104.

The forward reverse switch contact buttons 106, 108 are carried by bolts 118, 119 that provide electrical terminals for connection to the motor armature.

Forward reverse contact bar 104 is electrically connected to the speed switch contact plate 50 by means of bolts 120, 122 that mount the forward reverse contact bar and the speed switch plate 50 to the support 46. The other of the two forward reverse contact bars, bar 102, is electrically connected to the voltage switch fixed contact 29 by means of the bolt 66, that is adapted to be connected to the positive side of battery 22.

In one position (FIGS. 6 and 13) of the forward reverse rotor, its output terminal 118 is connected to the forward reverse contact 104 and thus, to the speed rotor and its other output terminal 119, is electrically connected to the forward reverse fixed contact 102 and thus, to the positive side of battery 22. In the other position (FIG. 14) of the forward reverse rotor, its contact button 106 and output terminal 118 are electrically connected with fixed contact bar 102, whereas its contact button 108 and output terminal 119 are electrically connected with fixed contact bar 104 whereby current through the motor is reversed.

As previously described, the mode of operation of speed control employing a plurality of low voltage resistively controlled speed positions, a high voltage speed position and an intermediate speed position in which field weakening is employed, requires a unique interaction and synchronization of operation of the speed switch with the voltage switch. In the described arrangement it is desirable that the low voltage condition of the batteries be available in the first four speeds. Further, the high voltage condition must obtain in the fifth speed and also in the neutral condition because it is in the latter that the conventional 36 bolt battery charging is employed.

To coordinate the operation of the two switches, there is employed a cam and cam-follower, having a lost motion connection between the two rotors. Thus, a sector shaped cam plate 130 is fixedly secured to the bell crank speed switch rotor 54 for rotation therewith about the speed switch pivot 56. Cam plate 130 is formed with an arcuate slot 132 in which rides a cylindrical cam follower 134 that is fixed to and between the voltage switch rotor support plate 70 and the voltage switch rotor base 68 (See FIG. 10).

Figure 9:
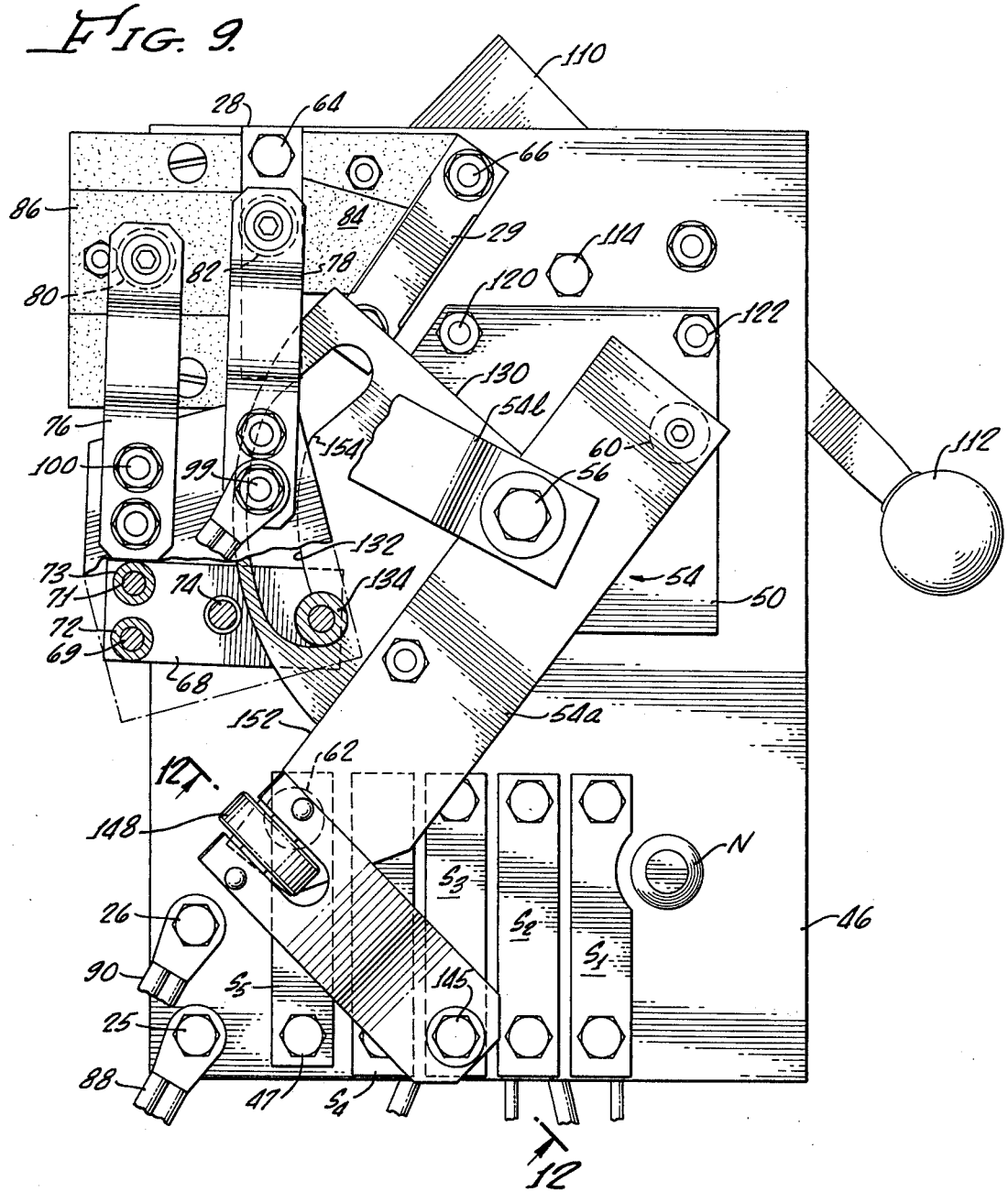
FIG. 9 shows the switch assembly in fifth speed position, with parts broken away.
Figure 17:
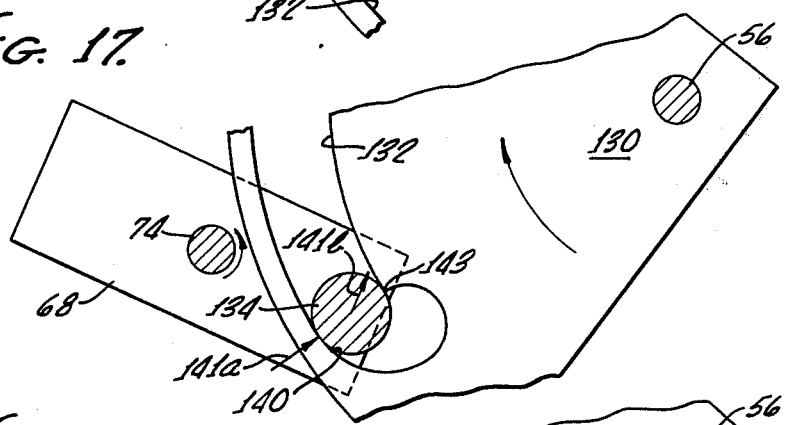
Figure 18:
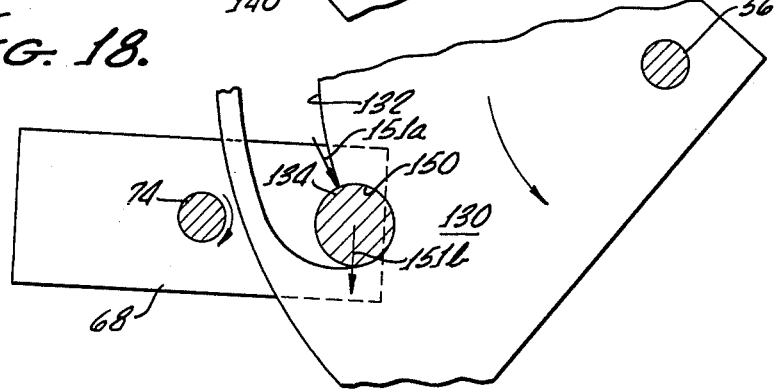

When the speed switch is at or near one end of its path of movement as, for example at or near the off position shown in FIGS. 5, 7, 15 and 16, one end portion of the cam slot 132 cooperates with the cam follower 134 to move the voltage switch rotor in one direction or another, depending on the direction of motion of the speed switch rotor. When the speed switch rotor is at or near the other end of its position of travel, that is at or near the fifth speed position as illustrated in FIGS. 9, 17 and 18, the other end of the cam slot cooperates with the cam follower 134 to move the voltage switch rotor between its two positions.

Figure 15:
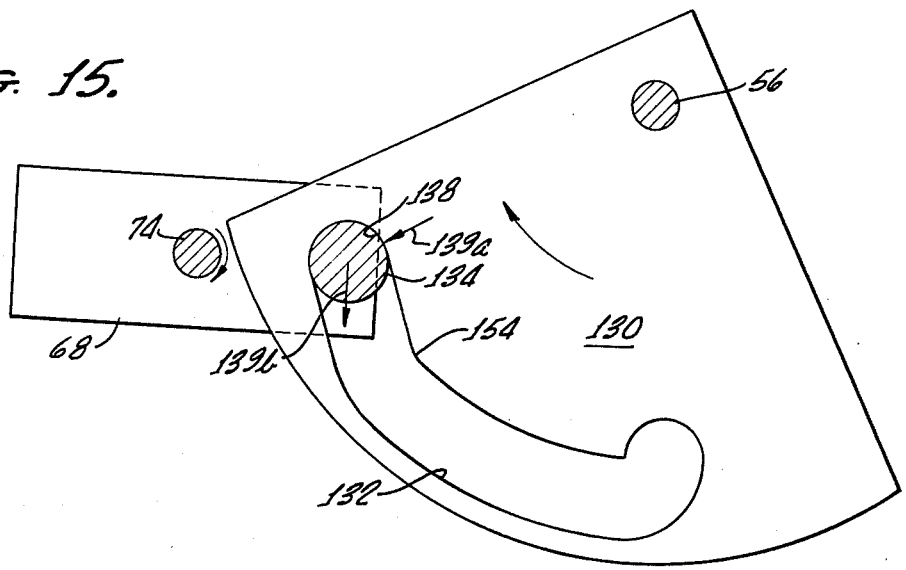
FIGS. 15, 16, 17 and 18 are diagrams illustrating action of the camming slot and cam follower in several different positions of the switch assembly.

When the speed switch rotor is in the off or neutral position, as illustrated in FIG. 15, the voltage switch rotor is in its 36 or high voltage position as previously described. As the rotor arm 54a (which fixedly carries cam plate 130 and cam slot 132) begins to move (in a clockwise direction as viewed in FIG. 5) from the position shown in FIG. 15 toward the first speed position, the outwardly facing surface 138 exerts a force on the cam follower 134 in the direction of the arrow 139a of FIG. 15. This causes the cam follower 134 to move in the direction indicated by arrow 139b and the voltage switch rotor to move in a clockwise direction about the voltage switch pivot 74. Thus, the batteries are reconnected from high voltage to low voltage condition.

Further clockwise movement of the speed switch rotor causes the cam follower 134 to ride in the arc of slot 132 without any further operation of the voltage switch rotor through and including the speed switch position in which the rotor arm 54a is in contact with the bar $S_4$, wherein one pair of field coils is disconnected and the power supplied to but a single pair of field coils at the junction between the two pairs.

Now as the speed switch rotor arm 54a starts to move from the fourth speed position, wherein its lower contact button 62 engages the fourth speed contact $S_4$ (FIGS. 8 and 17), an inwardly facing surface 140 at the other end of the arc of the cam slot 132 engages the cam follower 134 and applies a force thereto in the direction of arrow 141a to effect motion of the cam follower in the direction indicated by arrow 141b and to effect counter-clockwise motion of the voltage switch rotor about the pivot 74. The motion is such that the movable contact button of the voltage switch rotor, button 80, will move from engagement with its fixed contact 28 to a floating position, in engagement with the non-conductive plate 86. Button 82 will move from engagement with fixed contact 29, connected to the positive side of battery 22, to a position in engagement with contact 28, which is connected to the other side of battery 22.

At an intermediate position of the voltage switch rotor, movable button 82 is resting upon the insulating plate 84 and is in contact with neither of the contact bars 28 or 29, whereby all voltage sources are disconnected. Because of the proximity of the several contacts, it is possible for voltage arcing to occur between the movable contact button 82 and one or the other of the fixed bars, 28, 29. Accordingly, it is desirable to minimize dwell of the voltage switch rotor in such an intermediate position. To this end, an indexing roller and spring assembly is provided to resiliently restrain motion of the switching mechanism from fourth speed to fifth speed position and, further, to help to retain the mechanism in the fifth speed position.

Figure 12:
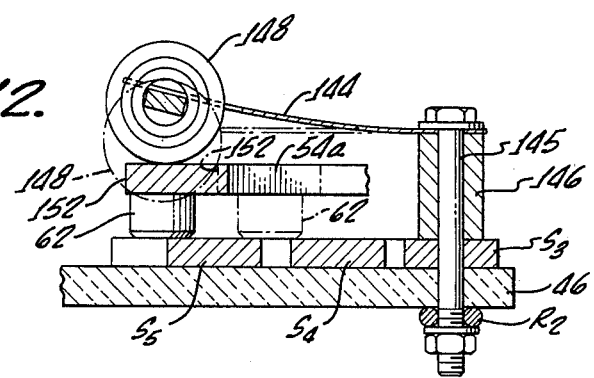
FIG. 12 is a section taken on line 12—12 of FIG. 9.

The indexing roller and spring assembly comprises a cantilevered resilient spring arm 144 that is fixed to the support 46 and spaced therefrom by means of a bolt 145 and spacing sleeve 146 (FIG. 12). Journalled in the outer free end of the spring arm 144 is a cam or camming roller 148 that is mounted on an axis spaced above the plane of travel of the speed switch arm 54a. The arrangement in such that, as illustrated in dotted lines in FIGS. 8 and 12, the leading edge 152 of the speed switch arm 54a will contact the indexing roller 148 which accordingly must be lifted against the restraint of spring arm 144 to allow continued clockwise rotation of the speed switch rotor 54a. Therefore, as the speed switch rotor is moved to the point illustrated in FIG. 5, suddenly increased resistance to motion of the speed switch rotor occurs and further increase in a clockwise actuating force exerted upon the speed switch rotor (as by the operators accelerator pedal linkage) is required to complete the motion of the speed switch arm 54a to the fifth speed position. As increased force is applied to the indexing roller assembly, the resilient restraint of the spring and roller assembly 144, 148 is abruptly overcome, and the rotor arm 54a will rapidly move through the transition between speed switch positions in contact with bars $S_4$ and $S_5$ to its high speed position in contact with bar $S_5$. In the fifth speed position the spring 144 presses the roller 148 downwardly upon the flat surface of the speed switch arm 54a to urge the latter more firmly into engaging contact with the fixed contact $S_5$ (as shown in solid lines in FIG. 12). Thus, increased frictional restraint is applied against any subsequent counterwise rotation of the speed switch rotor 54a from the fifth speed position toward lower speed positions.

Referring again to FIG. 17, camming action of the inwardly facing surface 140 of the cam slot 132 acts on the cam follower to cause the voltage switch rotor to move in a counter-clockwise direction as previously described. As the speed switch rotor 54 moves through its transition position between fourth and fifth speed, the indexing spring and roller that causes the speed switch arm 54 to move rapidly to fifth position also causes, by means of the cam and cam follower, a simultaneous rapid motion of the voltage switch from its low voltage to its high voltage position. Thus, the arrangement prevents (for all practical purposes) the voltage switch from remaining in an intermediate position between its high and low voltage positions. In actual operations, the rapid switching of the speed switch from fourth to fifth position and the concomitant rapid switching of the voltage switch from low to high voltage position is analogous to a snapping action and it is quite difficult, if not impossible, to manually move the switching assembly to a position wherein the voltage switch remains in an intermediate position, with its movable contact 82 only in partial contact with one or both of the fixed contacts 28 and 29. The snap action or rapid motion of the voltage switch (due to the indexing roller assembly 144. 148) is assisted by the cam slot configuration, including the sharp change in direction of the cam slot surface, as indicated at 143 in FIG. 17.

The cam slot and cam follower are in the position shown in FIG. 18 in fifth speed. With the speed switch in fifth speed position as illustated in FIGS. 9 and 18, counter-clockwise rotation of the speed switch rotor 54 causes an outwardly facing surface 150 of the cam slot to exert a force on cam follower 134 substantially in the direction of arrow 151a to cause the cam follower to move in the direction indicated by arrow 151b and to cause the voltage switch rotor to move in a clockwise direction about its pivot axis 74.

Thus, motion of the speed switch from fifth speed to fourth speed will move the voltage switch from high voltage to low voltage condition. In the course of this movement, both the speed switch rotor and the voltage switch rotor move through their unstable positions. As the point of contact of the surface of roller 148 with the outer surface of speed switch rotor 54a approaches the now trailing edge (during counter-clockwise rotation of speed switch rotor arm) 152 (FIG. 12), the speed switch arm 54a begins to obtain an unstable position. That is, when a line drawn between the axis of roller 148 and the point of contact between the roller and the surface of speed switch arm 54ais no longer perpendicular to the surface of support 46 (which is the direction in which the spring 144 urges the roller 148), the camming action of the curved roller surface will exert a force on the speed switch rotor arm 54a that tends to move the latter in a counter-clockwise direction and thus, the speed switch rotor is moved suddenly and rapidly from fifth speed position to fourth speed position under the urging of the indexing spring and roller assembly. Concomitantly, by virtue of the cam and follow action, the voltage switch moves rapidly and abruptly in a clockwise direction from the high voltage (FIGS. 9, 18) to a low voltage (FIG. 8) position.

Figure 16:
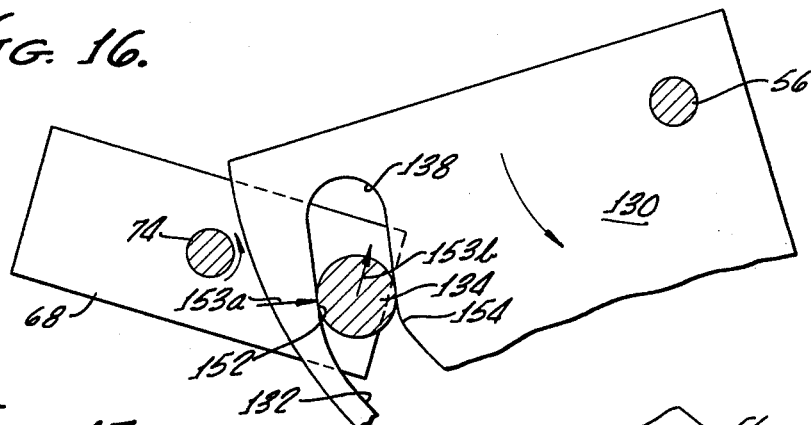

Continued counter-clockwise rotation of the speed switch allows the cam 134 to ride in the cam slot 132 until, in the first speed position illustrated in FIGS. 8 and 16, the cam follower 134 is engaged by an inwardly facing cam surface 152 which exerts a force upon cam follower 134 in the direction of arrow 153a to move the cam follower in the direction indicated by arrow 153b and to rotate the voltage switch rotor in a counter-clockwise direction about its pivot axis 74. Thus, as the speed switch moves from first position to neutral position, the voltage switch is automatically placed in high voltage position and is accordingly, in a condition for charging from a 36 volt charging apparatus.

The problem of arcing is considerably diminished at the low voltage speed condition such that arrangements such as the indexing spring and roller 144, 148 are not required to minimize dwell of the switch in the transition position between low and high voltage conditions as the switch moves between neutral and first speed. Nevertheless, the surface of the cam slot 132 is configured to provide a sharper bend, that is an outwardly facing surface of a much smaller radius of curvature, as indicated in 154. When the speed switch rotor moves between the neutral and first speed positions, the more sharply curved cam surface 154 is in contact with cam follower 134, providing a second relatively unstable condition which tends to urge the cam follower 134 and accordingly, the voltage switch rotor, from this unstable position.

There has been described an improved method and apparatus for speed control of an electric motor, comprising a unique combination of voltage control and field weakening by selectively disconnecting one of two pairs of oppositely disposed series connected field windings, and including a unique configuration of all mechanical switching, wherein a speed switch and voltage switch are synchronized to provide the desired sequence of electrical speed controlling arrangements, thereby to achieve improved performance and efficiency, smoothness of operation, economy of manufacture, simplicity of repair, and a longer more efficient operating life.

The foregoing detailed description is to be clearly understood as given by way of illustration and example only, the spirit and scope of this invention being limited solely by the appended claims.

What is claimed is:

1. A speed control for a motor having a plurality of series wound field coils comprising a variable voltage source,
voltage switch means movable between first and second positions for connecting said source to said coils to provide lower voltage in said first position of said voltage switch means and higher voltage in said second position of said voltage switch means,
speed switch means including a speed switch arm sequentially movable to positions of low, intermediate and high speed ranges, said speed switch means includng means operable in said intermediate range for disabling one of said coils while maintaining energization of another of said coils,
said speed switch means also including means operable in said low and high range for maintaining energization of at least said one coil,
means for causing said voltage switch means to move from said first position to said second position substantially together with movement of said speed switch arm to said high range from said intermediate range,
means for retaining said voltage switch means in said first position whenever said speed switch is in either of said low or intermediate speed ranges, and
said speed switch means including a plurality of different speed positions in said low range and further including means for connecting resistance in series with at least some of said coils in at least one of said different speed positions.

2. A speed control for a motor having a plurality of series wound field coils comprising
a variable voltage source,
voltage switch means movable between first and
second positions for connecting said source to said coils to provide lower voltage in said first position of said voltage switch means and higher voltage in said second position of said voltage switch means,
speed switch means including a speed switch arm sequentially movable to positions of low, intermediate and high speed ranges, said speed switch means including means operable in said intermediate range for disabling one of said coils while maintaining energization of another of said coils,
said speed switch means also including means operable in said low and high range for maintaining energization of at least said one coil,
means for causing said voltage switch means to move from said first position to said second position substantially together with movement of said speed switch arm to said high range from said intermediate range,
said speed switch arm being movable to an off position, and
including means for urging said voltage switch means to said second position thereof when said speed switch arm moves to said off position.

3. A speed control for an electric motor comprising:
a mounting board,
a plurality of speed switch fixed contacts mounted on the mounting board and including at least one low speed contact, an intermediate speed contact and a high speed contact,
a speed switch rotor pivoted to the mounting board and spaced from the fixed contacts, said speed switch rotor having a movable contact fixed thereto for sequential engagement with each of said speed switch fixed contacts as the rotor is pivoted from an off position wherein the movable contact engages none of the fixed contacts, through low and intermediate speed positions to a high speed position thereof,
a cam plate fixed to the speed switch rotor, said cam plate having an arcuate cam slot formed therein having first and second end portions and an intermediate portion,
means for connecting an accelerator member to said rotor for moving the rotor through and between said positions thereof,
first and second voltage switch fixed contacts fixed to the mounting board,
a voltage switch rotor on the mounting board and spaced therefrom, said voltage switch rotor having a pair of movable contacts extending therefrom toward the mounting board for selective engagement with said voltage switch fixed contacts,
said voltage switch rotor being pivotally mounted to the mounting board for movement between a low voltage position thereon in which there is one state of engagement between the fixed and movable contacts of the voltage switch and a high voltage position thereof in which there is a second state of engagement between the fixed and movable contacts of the voltage switch,
a cam follower fixed to the voltage switch rotor and extending therefrom into camming engagement within the cam slot of the cam plate, said first end portion of the cam slot having a first cam surface engaging said cam follower to move the voltage switch rotor from said high voltage position thereof to said low voltage position thereof as said speed switch rotor moves from said off position to a first low speed position, said first end portion of the cam slot including a second cam surface engaging said cam follower for driving said voltage switch rotor from said low voltage position thereof to said high voltage position thereof as said speed switch rotor moves from said low speed position to said off position,
said second end portion of said cam slot including a third surface engaging said cam follower for driving said voltage switch rotor from said low voltage position to said high voltage position thereof as said speed switch rotor moves from said intermediate speed position to said high speed position, said second end portion of said cam slot including a fourth cam surface engaging said cam follower for moving said voltage switch rotor from said high voltage position thereof to said low voltage position thereof as said speed switch rotor moves from said high speed position to said intermediate position thereof,
means for decreasing dwell of said voltage switch at a position thereof intermediate said high and low voltage positions comprising means for resiliently opposing motion of said speed switch rotor from said intermediate speed position to said high speed position thereof,
said means for resiliently opposing motion of said speed switch rotor comprising an index cam resiliently mounted to the mounting board and positioned to be displaced by the speed switch rotor as the speed switch rotor moves from said intermediate speed position to said high speed position thereof,
said index cam comprising a resilient arm fixed to and spaced from the mounting board, a roller journalled at a free end portion of the resilient arm upon an axis offset from the path of motion of the speed switch rotor, said roller being positioned to engage an edge of said speed switch rotor as the latter moves from said intermediate speed position toward said high speed position, whereby said roller is displaced from said mounting board as the speed switch rotor moves to said high speed position and said roller urges said rotor toward said mounting board and toward one of said speed switch fixed contacts when the rotor of the speed switch is in said high speed position, said speed switch rotor including a power terminal adapted to be connected to a source of power, said high speed fixed contact and said low speed fixed contact being electrically connected together, said low speed contact having a first control connection adapted to be connected to a motor to be controlled and said intermediate speed fixed contact having a connection adapted to be connected to a motor to be controlled independently of the first named connection, said speed switch fixed contacts including an off contact, first, second and third low speed contacts, a fourth contact and a fifth contact, a first resistor connecting said first and second low speed contacts, a second resistor connecting said second and third low speed contacts, a shunt connecting said third and fifth contacts, a first control output terminal connected with one of said third and fifth contacts, and a second control output terminal connected with said fourth contact, a motor having first and second pairs of oppositely disposed series connected field windings, the pairs of windings being connected in series to each other at a commmon junction, one end of said first pair of windings being connected to said first control output terminal, said second control output terminal being connected to said common junction, a voltage source having connections to at least one of said voltage switch contacts and to one end of the other of said pair of windings, and an electrical connection between said speed switch rotor and at least another of said voltage switch contacts.

4. The speed control of claim 3 wherein said voltage source includes first and second batteries having like polarity sides respectively connected to a first one of the voltage switch movable contacts and a first one of the voltage switch fixed contacts, respectively, and having opposite sides of like polarity connected respectively to the other of said movable voltage switch contacts and the other of said voltge switch fixed contacts, respectively, whereby said voltage switch in said high voltage position connects said two batteries in series with each other and in said low voltage position thereof connects said two batteries in parallel with each other.

5. A speed control for an electric motor having a plurality of series wound field coils comprising:

a mounting board, a plurality of speed switch fixed contacts mounted on the mounting board and including a plurality of low speed contacts, an intermediate speed contact and a high speed contact, a plurality of different resistors connected between said coils and said low speed contacts, a speed switch rotor pivoted to the mounting board and spaced from the fixed contacts, said speed switch rotor having a movable contact fixed thereto for sequential engagement with each of said speed switch fixed contacts as the rotor is pivoted from an off position wherein the movable contact engages none of the fixed contacts, through low and intermediate speed positions to a high speed position thereof, a variable voltage source connected with said rotor and said coils, means for connecting at least one of said coils to said speed switch fixed contacts so as to disconnect said one coil from said voltage source as said speed switch rotor is pivoted from said low speed position to said intermediate speed position, voltage switch means mounted on said board for switching said voltage source between high and low voltage conditions, and means responsive to pivoting of said speed switch rotor between said intermediate speed position and said high speed position for actuating said voltage switch means.

6. The speed control of claim 1 wherein said voltage switch means comprises, first and second voltage switch fixed contacts fixed to the mounting board, a voltage switch rotor on the mountng board and spaced therefrom, said voltage switch rotor having a pair of movable contacts extending therefrom toward the mounting board for selective engagement with said voltage switch fixed contacts, said voltage switch rotor being pivotally mounted to the mounting board for movement between a low voltage position thereof in which there is one state of engagement between the fixed and movable contacts of the voltage switch and a high voltage position thereof in which there is a second stage of engagement between the fixed and movable contacts of the voltage switch, said means for actuating said voltage switch means comprising means for pivoting said voltage switch rotor in response to pivotal motion of said speed switch rotor.

7. In combination with a motor having first and second pairs of oppositely disposed series connected field windings, the pairs of windings being connected in series to each other at a common junction, a speed control for the motor comprising:

a mounting board, a plurality of speed switch fixed contacts mounted on the mounting board and including at least one low speed contact, a speed swich rotor pivoted to the mounting board and spaced from the fixed contacts, said speed switch rotor having a movable contact fixed thereto for sequential engagement with each of said speed switch fixed contacts as the rotor is pivoted from an off position wherein the movable contact engages none of the fixed contacts, through low and intermediate speed positions to a high speed position thereof, a cam plate fixed to the speed switch rotor, said cam plate having an arcuate cam slot formed therein having first and second end portions and an intermediate portion, a means for connecting an accelerator member to said rotor for moving the rotor through and between said positions thereof, first and second voltage switch fixed contacts fixed to the mounting board, a voltage switch rotor on the mounting board and spaced therefrom, said voltage switch rotor having a pair of movable contacts extendng therefrom toward the mounting board for selective engagement with said voltage switch fixed contacts, said voltage switch rotor being pivotally mounted to the mounting board for movement between a low voltage position thereof in which there is one state of engagement between the fixed and movable contacts of the voltage switch and a high voltage position thereof in which there is a second state of engagement between the fixed and movable contacts of the voltage switch, a cam follower fixed to the voltage switch rotor and extending therefrom into camming engagement within the cam slot of the cam plate to move the voltage switch rotor between said high voltage position thereof and said low voltage position thereof as said speed switch rotor moves pivots through its positions, one end of said first pair of windings being connected with one of said speed switch fixed contacts, said common junction being connected to another said speed switch fixed contacts, a voltage source having connections to at least one of said voltage switch contacts and to one end of the other of said pair of windings, and an electrical connection between said speed switch rotor and at least another of said voltage switch contacts.

* * * * *

UNITED STATES PATENT AND TRADEMARK OFFICE
CERTIFICATE OF CORRECTION

PATENT NO. : 4,019,106
DATED : April 19, 1977
INVENTOR(S) : Robert L. Van Doren

It is certified that error appears in the above-identified patent and that said Letters Patent are hereby corrected as shown below:

Col. 2, line 58: delete "s" from "volts";

Col. 7, line 3: change "is" to ---if---;

Col.10, line 45: insert a parenthesis after "46" and before the comma;

Col. 11, line 29: after "speed" insert ---switch---;

Col. 12, line 53: after "fixed" and before "bars" insert ---contact---;

Col. 13, line 26: after "Fig. 17," insert ---the---;

Col. 13, line 40: change "ations" to ---ation---;

Col. 13, line 50: after "144" insert a comma in place of the period;

Col. 14, line 40: insert a comma after "is";

Col. 16, line 19: change "thereon" to ---thereof---.

Signed and Sealed this

Fourth Day of October 1977

[SEAL]

*Attest:*

RUTH C. MASON
*Attesting Officer*

LUTRELLE F. PARKER
*Acting Commissioner of Patents and Trademarks*